P. HANSON.
BUTTER MAKING MACHINE.
APPLICATION FILED MAY 15, 1912.
1,131,778.
Patented Mar. 16, 1915.
3 SHEETS—SHEET 3.
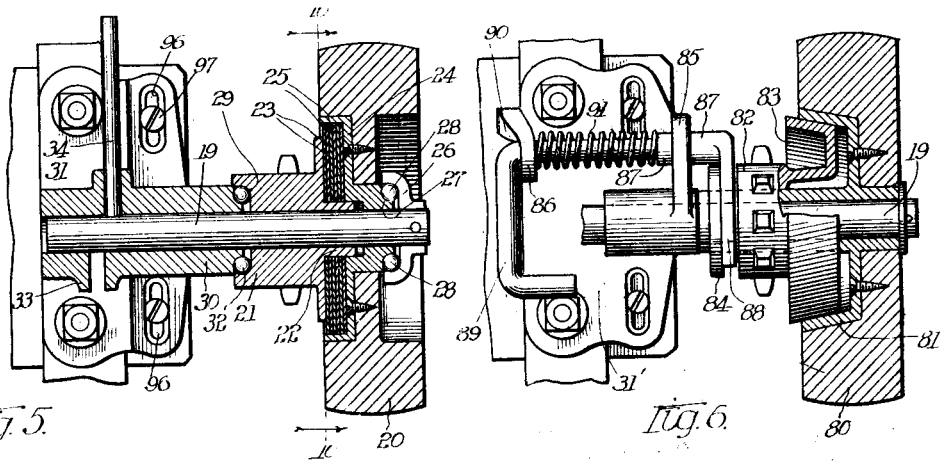
Fig. 5.
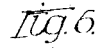
Fig. 6.
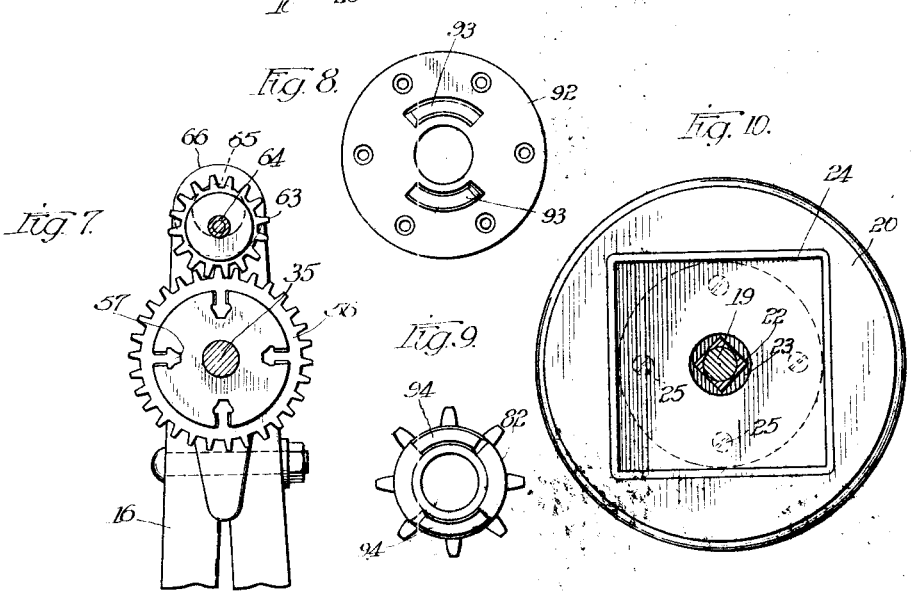
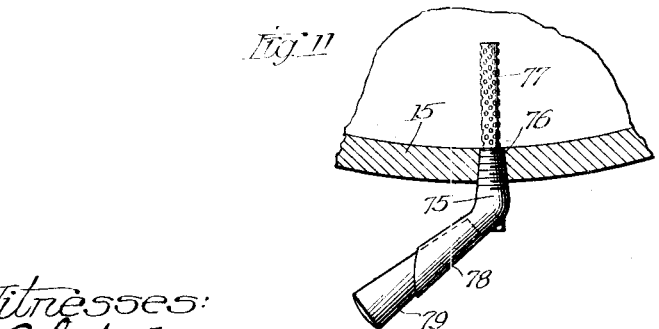
Witnesses:
Robert H. Weir
Arthur Carlson
Inventor
Paul Hanson
Browne & Hopkins
Attys

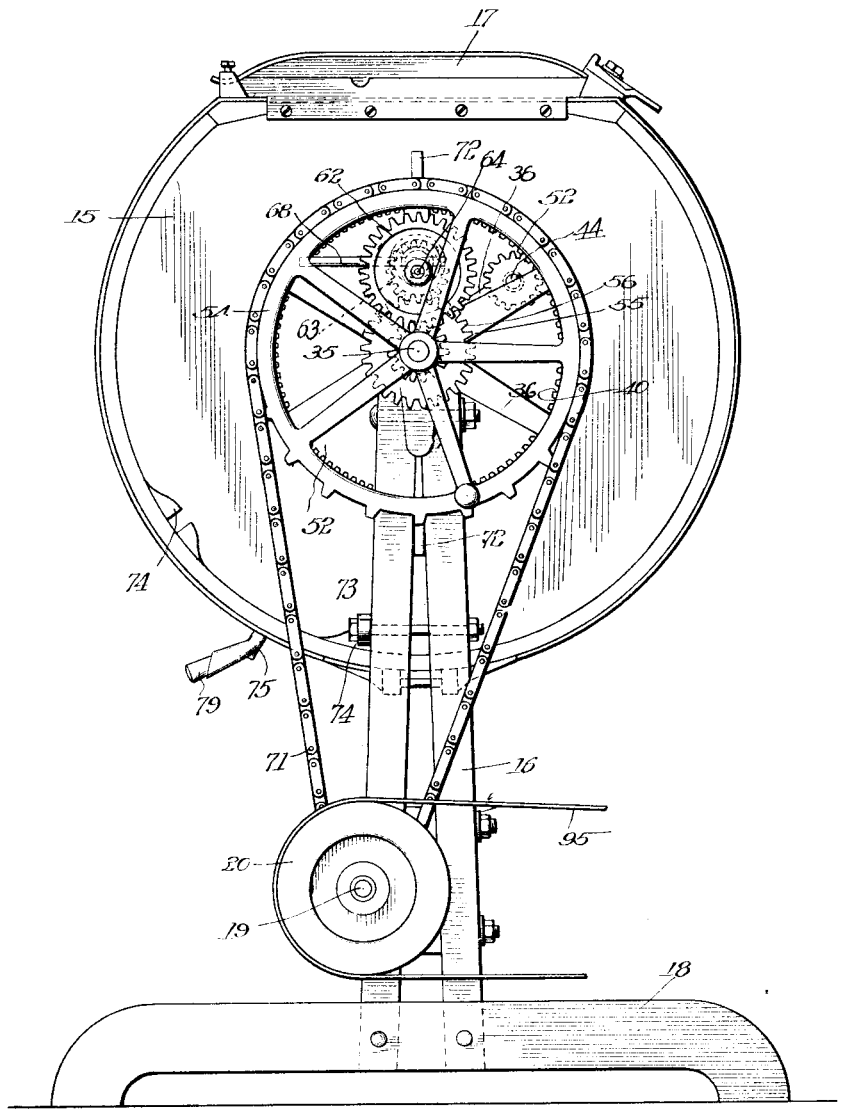

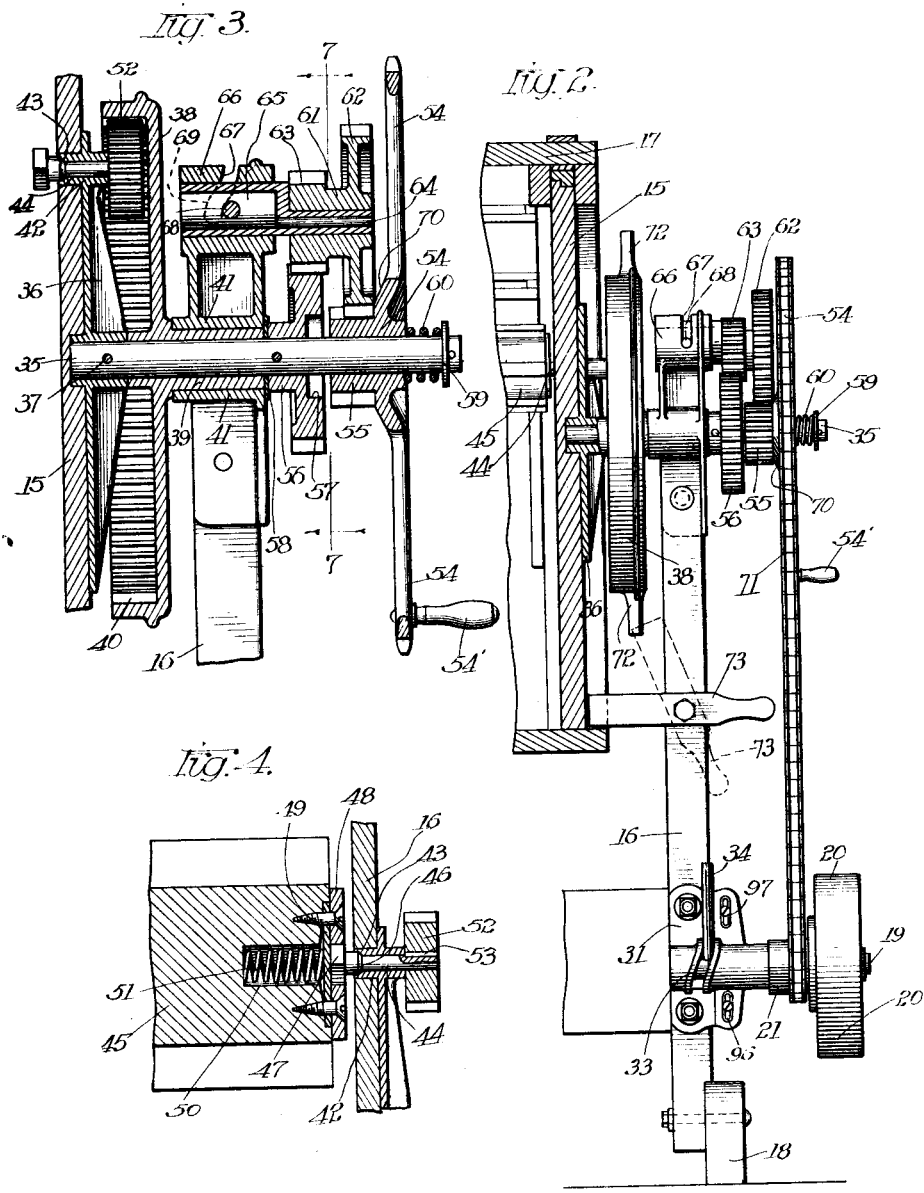

UNITED STATES PATENT OFFICE.

PAUL HANSON, OF WILD HORSE, COLORADO.

BUTTER-MAKING MACHINE.

1,131,778.　　　　Specification of Letters Patent.　　Patented Mar. 16, 1915.

Application filed May 15, 1912. Serial No. 697,399.

*To all whom it may concern:*

Be it known that I, PAUL HANSON, a citizen of the United States, residing at Wild Horse, in the county of Cheyenne and State of Colorado, have invented certain new and useful Improvements in Butter-Making Machines, of which the following is a specification.

This invention relates to combined churn and butter working machine, commonly known as a butter making machine, and the principal object of the invention is to provide new and improved means for effecting the operation of a power machine of this class, whereby a containing receptacle for the material may be rotated at different speeds while the driving pulley is rotated at the same speed, and at the same time to effect the rotation of butter working rolls when desired.

A further object of the invention is to provide new and improved means for effecting the operation and the changes of speed of the operating mechanism whereby the entire machine may be operated and controlled in a simple manner, and which is effective and efficient in operation.

For the attainment of these ends and the accomplishment of other new and useful objects, as will appear, the invention consists in the features of novelty in the construction, combination and arrangement of the several parts generally shown in the drawings and described in the specification, but more particularly pointed out in the appended claims.

In the drawings Figure 1 is an end view of a machine of this class, constructed in accordance with the principles of my invention, showing the mechanism for driving the rotatable drum at one end of the machine; Fig. 2 is a sectional elevation of a portion of the drum and a side elevation of the operating mechanism shown in Fig. 1; Fig. 3 is a detail view of part of the operating mechanism; Fig. 4 is a detail view of the end connection adjacent the operating mechanism of one of the butter working rollers; Fig. 5 is a sectional view of the preferred form of clutching device; Fig. 6 is a view of a modified clutching device of the frictional type; Fig. 7 is a view of a portion of the operating mechanism taken on the line 7—7 of Fig. 3; Figs. 8 and 9 show a modified form of engaging clutch between the driving pulley and the driving sprocket, consisting of interengaging parts by means of which the two members may be driven in unison; Fig. 10 is a view of the driving pulley taken on the line 10—10 of Fig. 5; Fig. 11 is an end view of a strainer faucet which may be applied to the drum.

In power operated machines of this class, and particularly of the smaller type, it is desirable to provide an operating mechanism in which the speed of rotation may be changed or varied with the least possible friction, and in the most efficient manner, without danger of injuring or breaking the gears, and without subjecting the drum or machine to a jerky or uneven operation in effecting the change of speed. The material contained in the rotatable drum is usually not acted upon continuously in the same manner, so that in the rotation of the drum the tendency of the material therein is to produce a jerky or uneven operation, and although this is largely obviated by constructions in which a number of butter working rollers are employed, it is desirable to reduce this uneven operation as much as possible. The present invention is designed to accomplish this result.

Referring now more particularly to the drawings, a drum or receptacle 15 is suitably mounted at the ends in the bearing standards 16. This drum may be of any desired or suitable construction, and is provided with a door 17, which preferably extends the full length of the drum, and is secured in place by any desired or suitable means. As the form of the drum proper constitutes no part of the present invention, a further description is not necessary. The bearing standards 16 may be and preferably are provided at their lower extremity with the base portions 18, by means of which they are strengthened and steadied.

Mounted on the bearing standards 16 at one end of the drum is a countershaft 19, upon which a driving pulley 20 is freely rotatable. Also freely mounted upon the countershaft 19 is a longitudinally movable driving sprocket 21, which is provided with means for engagement with the driving pulley. The preferred form of engaging means between the sprocket 21 and the pulley 20 is shown in detail by Fig. 5, in which it will be seen that the driving sprocket is formed with a hub portion 22, upon which are mounted a plurality of plates 23. These plates 23 are disposed within a recess in the pulley 20 formed by a member 24 preferably constituting a hub portion for the pulley, and with a recess substantially rectangular or square, as shown in Fig. 10. Disposed in this recess are plates 25 alternately placed with respect to the plates 23, which are secured to the sprocket member 21, so that the relative movement of the sprocket 21 and the driving pulley 20 toward each other will effect a frictional engagement of the plates 23 and 25 with respect to each other, whereby a driving engagement is formed between the pulley and the sprocket member 21. It is also obvious that when the longitudinal movement of the two members in the reverse direction is effected, that the plates will be separated and the separate members will be free to rotate with their respective members freely upon the shaft 19. In order to reduce the friction of the engagement of the sprocket and the driving pulley the outer end of the shaft 19 is provided with a ball retaining member 26, secured to the shaft and the outer portion of the member 24 is formed with a ball-race 27 in which the balls 28 are contained, constituting a ball-bearing for this end of the pulley. At the opposite end of the sprocket member 21 a recess or ball retaining chamber 29 is formed which in combination with a hub portion 30 of a bearing member 31 is adapted to hold the balls 32 in position constituting a ball-bearing for this end of the sprocket member 21. In order to effect the driving connection of the sprocket member 21 with the driving pulley 20, it is necessary to provide means for moving them longitudinally on the shaft 19 with respect to each other. For this purpose any desired or suitable means may be employed, such, for example, as shown in detail in Figs. 2 and 5, in which it will be seen that the bearing member 31 is provided with a grooved portion 33 communicating with the interior of the bearing portion for substantially half of the circumference thereof and extending at an angle or spirally with respect to the axis of the shaft 19. Secured to the shaft 19, as for example by inserting it through the shaft, is a bar 34 which is disposed in the spiral groove 33, and which is movable in the groove to rotate the shaft in its bearing and also to effect a longitudinal movement thereof with respect to the bearing. This longitudinal movement is effective to draw the outer end of the shaft 19 inwardly, thus compressing the pulley 20 and the driving sprocket 21 against each other and against the extending or hub portion 30 of the bearing member. It is evident that this will effect the clutching engagement of the driving pulley with the sprocket member 21. The bearing member 31 is preferably provided with slotted portions 96 and with fastening bolts or screws 97, by means of which the position of the bearing may be adjusted.

At the driving end of the drum 15 a driving shaft 35 is secured to a spider 36, which is positively secured in the end of the drum, as by means of the pin 37 or in any other suitable manner. Surrounding the shaft 35 and constituting a bearing therefor, is a freely rotatable member 38, having a hub portion 39 and the outer edge thereof is provided with internal teeth 40. This member 38 is also freely rotatable in the bearing member 41, supported by the bearing supports 16 at the upper end thereof. One or more of the arms of the spider 36 are provided with perforated bearing members 42 which extend through the adjacent end of the drum, and are provided at their inner end with a beveled or inclined bearing surface 43 (see Figs. 3 and 4). Mounted in each of the bearing members 42 is a freely rotatable pin or shaft 44, which constitutes a bearing support for one end of a butter working roller 45 mounted within the drum 15. This member 44 is preferably formed with an inclined shoulder 46 which bears against the inclined portion 43 of the bearing member 42, and is formed at the adjacent end with an enlarged portion 47 preferably rectangular in form. Secured to the end of the roller 45 is a plate 48 having an opening therein at the center adapted to receive the enlarged end 47 of the member 44, so that it may be mounted longitudinally therein, but cannot be rotated with respect to the roller. Disposed behind the plate 48 is a member 49 composed of any suitable flexible material, such as leather or the like, and a recess 50 is formed in the roller at the end thereof so that a spring 51 disposed therein will bear against the flexible material 49, and will press against the enlarged end 47 of the member 44. This constitutes an automatic tightening arrangement for the roller, whereby it will always be held in the drum and in connection with the bearing member 44 with substantially the same pressure. This member 44 also constitutes a driving shaft for the roller, and since it cannot be rotated relatively to the roller 45, the rotation of the member 44 effects also the rotation of the roller. For this purpose a driving gear 52 is secured to the outer end of the member 44 by means of a key 53, or in any other suitable manner, and the gear 52 meshes with the inner teeth 40 of the member 38, freely mounted upon the main driving shaft 35. Another object for the construction of the member 44 in this preferred form is to provide means for preventing the escape of fluid from within the drum through the opening therein, which is necessary for the mounting of the member 44 by means of which the butter working rollers are rotated. For this purpose the member 44 is pressed outwardly in the bearing portion 42, so that the beveled shoulder 46 presses against the beveled surface 43 by reason of the pressure of the spring 51, thereby forming a fluid tight joint and preventing the escape of liquid from within the drum.

It is evident that any number of butter working rollers 45 may be employed in connection with the drum, but in the present exemplification of the invention, and as shown in Fig. 1, only one of the butter working rollers is employed, the driving gear 52 therefor meshing with the interior gear 40, so that to effect the rotation of the roller in the drum it is necessary to effect the relative rotation of the member 38 with respect to the drum and with respect to the shaft 35.

In order to effect the rotation of the shaft 35 a sprocket wheel 54 having a hub-shaped portion 55, with gear teeth formed therein, is rotatably mounted upon the shaft 35, and a gear 56 having internal teeth 57 is positively secured to the shaft. The sprocket wheel is preferably provided with a handle 54' by means of which it can be independently rotated by hand without connection with the driving sprocket. This gear 56 is preferably disposed adjacent the bearing member 41, and an anti-friction washer 58 is preferably disposed between the gear 56 and the hub portion 39 of the member 38. The internal teeth 57 of the member 56 (see Fig. 7) are adapted to receive and engage the teeth of the hub-shaped portion 55 of the sprocket wheel 54 when the latter is moved longitudinally of the shaft 35 into engagement therewith. To effect this movement the shaft 35 is provided at its outer end with a shoulder or removable collar 59, between which and the sprocket wheel 54 a coil spring 60 is disposed, which tends normally to press the sprocket wheel into engagement with the said teeth 57.

In order to hold the sprocket 54 out of engagement with the gear 56 a member 61, having the double driving gears 62 and 63, the former of which is in engagement with the teeth of the hub portion 55, and the latter of which is in engagement with the gear 56, is provided. This member 61 is mounted upon a spindle or shaft 64 which extends eccentrically from a rotatable member 65. This member 65 is rotatably mounted in a bearing 66 which is preferably formed integral with the bearing member 41. The upper part of this rotatable member 65 is formed with an inclined slot or spiral groove 67 extending substantially half of the diameter of the bearing portion 66. Secured to the member 65 is a bar 68 which extends outwardly therefrom and is disposed in the groove or slot 67, so that the movement of the bar 68 will effect the rotation and a longitudinal movement of the member 65 in the bearing support 66. Since the bearing shaft 64 upon which the member 61 is rotatable is eccentrically disposed with respect to the member 65, it is obvious that the rotation of the bar 68 and of the member 65 will effect a corresponding movement of the member 61. Since the side of the groove 67 as viewed in Fig. 2 is substantially perpendicular and the opposite side, hidden from view but shown in dotted outline at 69 in Fig. 3 is at an angle thereto, or is spirally disposed with respect to the member 65, it is obvious that the first action in the rotation of the member 65 by means of the bar 68 will cause the movement of the member 61 in an upward direction which will lift it free of contact with the gears 55 and 56. The next action caused by the rotation of the member 65 will effect the longitudinal movement not only of the member 65, but also of the member 61. This operation will permit the sprocket 54 to be moved by the spring 60 into engagement with the teeth 57.

In order to return the member 61 to its engaged position, it is necessary only to rotate the bar 68 in the reverse direction and to effect the inter-engagement of the gear 62 with the gear 55, and of the gear 63 with the gear 56. For this purpose the inner face of the sprocket 54 is formed adjacent the hub with an inclined surface 70, which is engaged by the teeth of the gear 62 when the member 65 is moved toward the sprocket 54, and then downwardly by the rotation of the member 65. It is evident that the teeth of the gear 62 will engage or contact with the inclined surface 70, causing the sprocket 54 to be pressed longitudinally on the shaft against the pressure of the spring 60, which will separate the sprocket from its engagement with the gear 56, and will secure the direct driving connection between the sprocket and the gear 56. When the member 61 is in engagement with both the sprocket and the gear 56, it is obvious that the drum 15 will be driven at a much reduced speed, since the gear 62 as shown in the present embodiment of the invention is much larger than the gear 63, and since the gear on the hub 55 is smaller than the gear 56. The driving connection between the sprocket 54 and the driving sprocket 21 is completed by the driving chain 71, which may be of any desired or suitable construction to engage with the teeth of the separate sprockets, and forming thereby a positive driving connection.

In order to effect the rotation of the butter working rollers 45 in the drum at any time, it is necessary only to cause a difference in the speed of rotation between the member 38 and the driving shaft 35. For this purpose the member 38 is provided with extending lugs 72 and the bearing supports 16 are provided with a lever 73 pivoted thereto, which when rotated extends into the path of the lugs 72 to stop the member 38, thereby causing the gears 52 to be rotated by reason of their engagement with the teeth 40 of the member, and to cause the rotation of the butterworking rollers in a direction opposite to that of the rotation of the drum 15. It is obvious that this member 38 may be stopped by the engagement of the lever 73 with the lugs 72 when the shaft 35 is rotating at high or low speed. Another function of this lever 73 is to engage and hold the drum 15 in any desired or suitable position, as, for example, when material is being placed in the drum, or is being removed therefrom, and for this purpose the edge of the drum adjacent the operating end thereof is provided with members 74 which form a notch in which the end of the lever 73 engages, thereby holding the drum from rotation in either direction.

In order to remove fluid material from the drum, a strainer faucet similar to that shown by Fig. 11 may be employed, which consists of a spout 75, preferably tapered at the ends, having a threaded portion 76 for insertion in the wall of the drum, and a strainer portion 77 attached thereto and projecting within the drum. The outer end 78 is preferably disposed at an angle to the threaded portion thereof, and is adapted to receive a tapered plug 79. This plug is of such a size that it may be inserted in the opening in the drum when the faucet is removed, and used to seal the drum and close the opening instead of the faucet. It is also contemplated that a simple friction clutch may be employed for connecting the driving sprocket with the driving pulley, and for this purpose an arrangement similar to that shown by Fig. 6 may be employed, in which a driving pulley 80 is provided with an internal friction member 81 forming a recess therein from one side of the pulley, and a driving sprocket 82 is provided with a coöperating and extending friction member 83 which may be moved longitudinally to contact with the friction member 81 in the pulley. The driving sprocket is also provided with a reduced portion and a collar 84. Secured to a bearing member 31' or formed integral therewith are bearing supports 85 and 86 for an operating member 87. This member 87 is provided with a yoke portion 88, which is adapted to engage in the reduced portion adjacent the collar 84 of the driving sprocket 82 and the other end of the member 87 is formed with a handle or crank portion 89. The bearing support for this member 87 at the end adjacent the crank is formed with an inclined portion 90 against which the crank portion 89 bears. The crank portion 89 is rotatable with respect to the yoke 88, but is longitudinally movable with respect thereto, so that when the crank 89 is rotated to engage the inclined surface 90, the crank portion 89 will be moved longitudinally, carrying with it the extending portion of the yoke 88 which is free to move in the projection 85. A coil spring 91 is disposed about the member 87, between the lug or bearing support 86, and the end or shoulder of the member 87 which projects through the bearing lug 85, so that the tendency of the spring is to press the yoke 88 and the sprocket 82 into engagement with the clutching device in the pulley 80.

If desired a simpler driving arrangement may be employed, such, for example, as that shown by Figs. 8 and 9, in which a plate 92 is formed with recesses or depressions 93, and is secured to one of the members, as, for example, to the driving pulley, and the driving sprocket 82 is formed with projections 94 which are adapted to engage in the recesses 93, it being necessary only to move the projections 94 into the recesses and cause the interengagement and proper driving connection between the members.

In operation the driving pulley 20 is rotated by means of a belt 95 (see Fig. 1), or other suitable means, and it is preferable that the speed of rotation of the driving pulley 20 be maintained practically constant. This is the condition most frequently met with in factories and the like, and in order to effect the operation of the butter making machine it is necessary only to place the driving sprocket 54 in the desired driving connection by rotating the bar 69 at the top of the bearing support, whereupon the sprocket 54 will be placed in direct connection with the driving shaft 35 by means of the gear 56, and which may also be connected by means of the member 61 with the gear 56 to cause an indirect driving connection with the shaft. Under either of these conditions the butter working rollers may be separately rotated in the butter working machine by simply engaging the member 38 with the lever 73, whereupon the rollers will be rotated in the opposite direction. When the sprocket 54 is in the selected driving position the driving sprocket 21 may be engaged with the driving pulley by moving the bar 34 which is connected to the countershaft 19, thereby effecting the driving connection of the sprocket 21 with the driving pulley 20. The multiple disk clutching mechanism is particularly adapted for use in this connection, for the reason that it permits the relative slipping of the pulley 20 and the sprocket 21 in starting, or they may be locked firmly in driving connection. In this manner the butter working machine may be started with a large load and gradually accelerated by gradually increasing the pressure with which the clutch is applied.

While I have thus described the preferred embodiment of my invention, it is evident that others skilled in the arts to which this appertains may make various changes in the construction, combination and arrangement of the several parts without departing from the spirit and scope of the invention.

What I claim is:—

1. In a butter working machine, the combination with a rotatable drum, of operating mechanism therefor, a driving pulley, means to connect the operating mechanism to the driving pulley, comprising a sprocket having means for driving engagement with the pulley, and means to place the sprocket in such driving engagement.

2. In a butter working machine, the combination with a rotatable drum, of operating mechanism therefor, comprising a countershaft, a pulley freely mounted upon the countershaft, a driving sprocket having means for clutching engagement with the driving pulley, and means to place both the driving pulley and the sprocket in clutching engagement with each other.

3. In a butter working machine, the combination with a rotatable drum, of operating mechanism therefor, comprising a countershaft, a pulley freely rotatable thereon, a driving sprocket also freely rotatable on the countershaft, and means in conection with the countershaft for pressing the sprocket and the pulley together to lock them in driving engagement with each other.

4. In a butter working machine, the combination with a rotatable drum, of operating mechanism therefor, comprising a countershaft, a bearing for said countershaft having a slot therein communicating with the chamber for the countershaft, the said slot being disposed at an angle to the axis of the shaft, a driving pulley freely mounted upon the shaft, a sprocket freely mounted upon the shaft between the pulley and the bearing, and means in connection with the shaft whereby it may be independently rotated to press the pulley and the sprocket into driving engagement with each other.

5. In a butter making machine, the combination with a rotatable drum of driving mechanism therefor, comprising a countershaft, a bearing therefor, having an extending hub portion with a slot therein communicating with the interior of the bearing, the countershaft being freely rotatable therein, a bar secured to the countershaft and extending through the said slot, whereby the shaft may be rotated, a driving pulley freely mounted upon the shaft, a driving sprocket also freely mounted on the shaft and disposed between the driving pulley and the extending portion of the bearing member, a member secured to the outer end of the countershaft bearing against the outer surface of the pulley, and interengaging means on the adjacent faces of the sprocket and pulley whereby they may be pressed into engagement when the bar is rotated in the slot of the bearing member.

6. In a butter making machine, the combination with a rotatable drum of driving mechanism therefor, comprising a countershaft, a bearing therefor, having an extending hub portion with a slot therein communicating with the interior of the bearing, the counter-shaft being freely rotatable therein, and the end of the hub-shaped portion being formed with a retaining groove, a driving pulley freely mounted on the shaft, a driving sprocket also freely mounted on the shaft and being provided at its inner end with a grooved shaped portion corresponding with the groove in the outer end of the hub member and forming in connection therewith a ball race, balls disposed in the said ball race, and means in connection with the counter-shaft to press the pulley and the sprocket together against the said ball bearing to form a locking engagement thereof.

7. In a butter making machine, the combination with a rotatable drum of operating mechanism therefor, comprising a countershaft, an adjustable bearing therefor formed with a projecting hub portion and with a slot in the upper face of the hub portion communicating with the bearing surface thereof for substantially half of the circumference thereof and extending at an angle to the axis of the bearing surface, inter-engaging driving members freely mounted on the countershaft, a member secured to the shaft at the outer end thereof, and a bar secured to the shaft extending through the slot in the bearing and operative when rotated in the slot to effect the engagement and separation of the said driving members.

8. In a butter making machine, the combination with a rotatable drum of operating mechanism therefor, comprising a countershaft, a bearing therefor slotted in its upper surface at an angle to the axis of the bearing, a driving pulley freely mounted upon the countershaft, a driving sprocket also freely mounted on the countershaft and disposed between the pulley and the bearing, a member secured to the outer end of the shaft forming a ball race with the adjacent surface of the driving pulley, ball bearings disposed therein, and a bar connected to the countershaft extending through the slot in the bearing, the said bar being effective to rotate the countershaft and to press the pulley into driving engagement with the sprocket against the outer end of the bearing.

9. In a butter making machine, the combination with a rotatable drum of driving mechanism therefor, comprising a countershaft, a bearing for the countershaft having an extending hub portion with a slot in the upper face thereof extending at an angle to the axis of the bearing surface and communicating therewith for substantially half of the circumference thereof, a driving pulley and a driving sprocket freely mounted upon the shaft and movable longitudinally thereof, the sprocket being disposed between the pulley and the extending hub portion of the bearing member, the sprocket being formed with a recess corresponding with another recess on the adjacent end of the bearing and forming a ball race, a member secured to the outer end of the countershaft formed with a groove and constituting in connection with the adjacent surface of the driving pulley another ballrace, ball bearings disposed in said ball races, inter-engaging means between the adjacent surfaces of the pulley and the sprocket, and a bar inserted in the countershaft and protruding through the slot in the bearing operative to effect the rotation of the said countershaft within predetermined limits and effective when rotated in one direction to press the adjacent surfaces of the pulley and the sprocket into driving engagement by pressing the inner end of the sprocket in engagement with the extending portion of the hub of the said bearing member.

10. In a butter making machine, the combination with a rotatable drum of driving mechanism therefor, comprising a countershaft, a bearing for said countershaft, a driving sprocket formed with an extending hub portion, a plurality of plates mounted on said hub portion, a driving pulley mounted upon the shaft adjacent to the driving sprocket, and having a recess in the adjacent face thereof, plates mounted in said recess and disposed alternately with respect to the plates mounted on the hub of the sprocket, each formed with an opening larger than the hub portion of the sprocket, the said plates being secured against rotation to each of their respective members and movable longitudinally of the shaft, and means to press the said sprocket and the driving pulley together to effect the driving connection thereof.

11. A butter making machine of the class described, comprising a rotatable drum having an operating shaft at one end thereof, a driving gear secured thereto having internal teeth, a sprocket freely mounted on the shaft having a hub shaped portion with external teeth adapted to engage the said internal teeth of the fixed gear, and means tending normally to press the sprocket in engagement with the said gear.

12. A butter making machine comprising a rotatable drum having an operating shaft at one end a driving gear secured to the said shaft, a sprocket freely mounted upon the shaft, and an eccentrically pivoted gear member having separate gears formed integral therewith, and of different sizes to engage the sprocket and the said gear.

13. A butter making machine comprising a rotatable drum having a driving shaft at one end thereof, a bearing support therefor, a driving gear secured to the shaft, a sprocket freely mounted upon the shaft, having a hub-shaped portion with external teeth, means tending normally to press the sprocket in engagement with the fixed gear, a member having separate gears of different sizes meshing with the teeth on the hub of the sprocket and with the said fixed gear, and a pivotal mounting for the said member eccentrically disposed with respect to the axis of the member.

14. A butter making machine comprising a rotatable drum, having a driving shaft at one end thereof, a bearing support therefor, a driving gear secured to the shaft, a sprocket freely mounted upon the shaft having a hub-shaped portion with external teeth, means tending normally to press the sprocket in engagement with the fixed gear, a member having separate gears of different sizes meshing with the teeth on the hub of the sprocket and with the said fixed gear, and a rotatable member having an eccentrically disposed projection for moving the said double geared member.

15. A butter making machine comprising a rotatable drum having a driving shaft at one end thereof, a bearing support therefor, a driving gear secured to the shaft, a sprocket freely mounted upon the shaft having a hub-shaped portion with external teeth, means tending normally to press the sprocket in engagement with the fixed gear, a member having separate gears of different sizes meshing with the teeth on the hub of the sprocket, and with the said fixed gear, an eccentrically mounted pivot pin for said member, and means to rotate the pivot pin about its eccentric mounting.

16. A butter making machine comprising a rotatable drum having a driving shaft at one end thereof, a bearing support therefor, a driving gear secured to the shaft, a sprocket freely mounted upon the shaft having a hub-shaped portion with external teeth, means tending normally to press the sprocket in engagement with the fixed gear, a member having separate gears of different sizes meshing with the teeth on the hub of the sprocket and with the said fixed gear, an eccentrically mounted pivot pin for the said member rotatably mounted in one of the bearing supports, and means connected thereto for rotating the said pivot pin about its eccentric mounting whereby the said double geared member is raised from its engagement with the said gears.

17. A butter making machine comprising a rotatable drum having a driving shaft at one end thereof, a bearing support therefor, a driving gear secured to the shaft, a sprocket freely mounted upon the shaft having a hub-shaped portion with external teeth, means tending normally to press the sprocket in engagement with the fixed gear, a member having separate gears of different sizes meshing with the teeth on the hub of the sprocket and with the said fixed gear, an eccentrically mounted pivot pin for the said member rotatably mounted in one of the bearing supports, and means connected thereto for rotating the said pivot pin about its eccentric mounting, whereby the said double geared member may be moved longitudinally with respect to its axis.

18. A butter making machine comprising a rotatable drum having a driving shaft at one end thereof, a bearing support therefor, a driving gear secured to the shaft, a sprocket freely mounted upon the shaft having a hub-shaped portion with external teeth, means tending normally to press the sprocket in engagement with the fixed gear, a member having separate gears of different sizes meshing with the teeth on the hub of the sprocket and with the said fixed gear, an eccentrically mounted pivot pin for the said member rotatably mounted in one of the bearing supports, and means connected thereto for rotating the said pivot pin about its eccentric mounting, whereby the said double geared member is first raised to disconnect it from the sprocket and the fixed gear and is then moved longitudinally in a direction away from the sprocket.

19. A butter making machine comprising a rotatable drum having an operating shaft secured thereto at one end, bearing supports for the drum and for the said shaft, a gear with external teeth having internal teeth in one face thereof, positively secured to the shaft, a sprocket freely rotatable on the shaft having a hub portion adapted to engage the internal teeth of the said gear, a spring tending normally to press the sprocket into engagement with said internal teeth, a pivot pin with an eccentric projection rotatably mounted in the bearing support, a member having separate gears mounted upon the said pivot pin and with the gears adapted to mesh with the external teeth of the said fixed gear and with the teeth of the said sprocket, the said member opposing the normal action of the spring to press the sprocket into engagement with the fixed gear when the teeth of the said member are in engagement with the teeth on the hub of the sprocket, the bearing support being formed with a slot extending substantially half of the diameter of the bearing portion and with a portion thereof disposed at an angle to the axis of the bearing pin, and a bar secured to the eccentrically mounted bearing pin and extending through the slot, the said bar being operated through a part of its movement in the slot to raise the double geared member free of its gearing connection and through the remainder of its movement to move the said member longitudinally upon its own axis at the same time it is rotated.

20. A butter making machine comprising a rotatable drum having an operative shaft secured thereto at one end of the bearing support therefor, a gear secured to the shaft having a recess in the outer face thereof provided with teeth, a sprocket rotatably mounted on the shaft with a toothed hub portion extending in the direction of the said fixed gear, an eccentrically mounted member movable vertically and longitudinally into and out of engagement with the teeth, both of the sprocket and the gear a spring tending normally to press the sprocket into direct connection with the said fixed gear on the shaft, the inner side of the sprocket adjacent the hub-shaped portion being formed with a shoulder against which the teeth of the double geared member contact when the double geared member is in driving engagement with the sprocket and having an inclined surface extending from said shoulder to the face of the sprocket, whereby in moving the double geared member into engagement with the sprocket the teeth will first engage the inclined surface to press the sprocket outwardly against the tension of the spring.

21. A butter working machine comprising a rotatable drum, an operating shaft secured thereto, bearing supports for the drum and for the shaft, a sprocket freely mounted upon the shaft, means to effect a direct driving connection between the shaft and the sprocket, a shiftable gear to form indirect driving connection between the shaft and the sprocket a countershaft, a driving pulley mounted thereon, a driving sprocket also freely mounted on the countershaft, a sprocket chain connecting the driving sprocket with the sprocket freely mounted upon the operating shaft, means to effect a driving connection between the driving sprocket and the driving pulley, and means to select the driving connection of the said freely mounted sprocket with the operating shaft, whereby the drum may be operated at either desired speed.

22. In a butter working machine, the combination with a rotatable drum, of a spider connected thereto, an operating shaft connected to the spider, bearing supports for the drum and for the shaft, a sleeved member freely rotatable upon the shaft having internal teeth and disposed adjacent the face of the drum, the said spider being formed with a perforated bearing portion which extends through the adjacent face of the drum and is formed at its inner end with an inclined bearing surface, a shaft rotatable in said bearing portions having a shoulder which contacts with the shoulder in the bearing portion and formed with an enlarged end of rectangular shape, a gear secured to the outer end of said shaft and meshing with the internal teeth of the said sleeved member, a roller mounted within the drum having an end plate with an opening to engage the enlarged end of the bearing shaft, means to rotate the operating shaft, and means to engage the said sleeved member whereby the roller within the drum will be rotated in a direction opposite to the rotation of the drum at the same time that it is rotated with the drum.

23. In a butter working machine, the combination with a rotatable drum, of a bearing member disposed at one end thereof and comprising a perforated member having a beveled shoulder therein at the inner end, a bearing pin mounted therein from the inside extending through the perforated member and, having a beveled shoulder to engage the corresponding portion in the said bearing and an inner end of rectangular or irregular form, a butter working roller disposed within the drum, a plate disposed at the end of the roller having a recess therein to receive the rectangular end of the bearing pin, resilient means disposed within the roller tending to press the bearing pin outwardly whereby the shoulder thereof will be pressed firmly against the corresponding shoulder in the bearing to prevent the escape of fluid therefrom, and means to rotate the bearing pin.

24. In a butter working machine, the combination with a rotatable drum, of a bearing member disposed at one end thereof and comprising a perforated member having a beveled shoulder therein at the inner end, a bearing pin mounted therein from the inside, protruding through the perforated member, having a beveled shoulder to engage the corresponding beveled portion in the said bearing and an inner end of rectangular form, a butter working roller disposed within the drum, a plate disposed at the end of the roller having a recess therein to receive the rectangular end of the bearing pin, a piece of flexible material disposed behind the said plate and bearing against the rectangular end of the bearing pin, a spring pressing against the flexible member to press the bearing pin outwardly in the bearing support therefor, the butter working roller being provided with a suitable recess to receive the said spring, and means in connection with the protruding end of the bearing pin to rotate it and the roller.

25. In a machine of the class described, the combination with a drum, of a spider secured thereto, an operating shaft secured to the spider, a sleeved member freely rotatable on the shaft and having internal teeth disposed adjacent the end of the drum, bearing supports for the drum and shaft, the sleeved member being directly rotatable in the bearing support and the said shaft being rotatable in the sleeve, a butter working roller freely rotatable within the drum, gears secured thereto and disposed outside of the drum in position to mesh with the interior teeth of said sleeved member, means to rotate the operating shaft in rotating the drum, and the butter working roller, and a stop to engage the sleeved member whereby the butter working roller may be rotated in a direction opposite to the rotation of the drum as it is revolved in the drum.

26. In a butter working machine of the class described, the combination with a rotatable drum, of an operating shaft secured thereto, a sleeved member freely mounted upon the shaft forming a bearing support therefor, having internal teeth and external lugs, bearing supports for the machine and for the said sleeved member, means to rotate the shaft, butter working rollers within the drum having gears outside thereof which engage with the interior teeth of the said sleeved member, and a lever pivotally mounted on the bearing support and movable into the path of the lugs on the said sleeved member, whereby the said member may be engaged and its rotation with the drum prevented when the drum is rotated, thereby rotating the butter working rollers in a direction opposite to the rotation of the drum.

27. In a butter making machine, the combination with a rotatable drum having an operating shaft at one end, of a driving gear secured to the shaft, a sprocket freely mounted upon the shaft engaging means between the sprocket and the gear, movable into and out of said engagement, the said sprocket being provided with a handle, a counter shaft substantially parallel with the operating shaft, a driving sprocket freely rotatable thereon, a driving pulley also freely rotatable on the counter shaft, means to cause the engagement of the driving sprocket with the driving pulley, a sprocket chain to connect the driving sprocket with the sprocket freely mounted upon the operating shaft, the drum being rotatable independently by means of the said handle when the driving sprocket is free to rotate upon the counter shaft.

In testimony whereof I have signed my name to this specification, in the presence of two subscribing witnesses, on this 4th day of May A. D. 1912.

PAUL HANSON.

Witnesses:
G. B. BENNETT,
RACHEL C. PETERS.

Copies of this patent may be obtained for five cents each, by addressing the "Commissioner of Patents, Washington, D. C."